United States Patent Office 3,515,951
Patented June 2, 1970

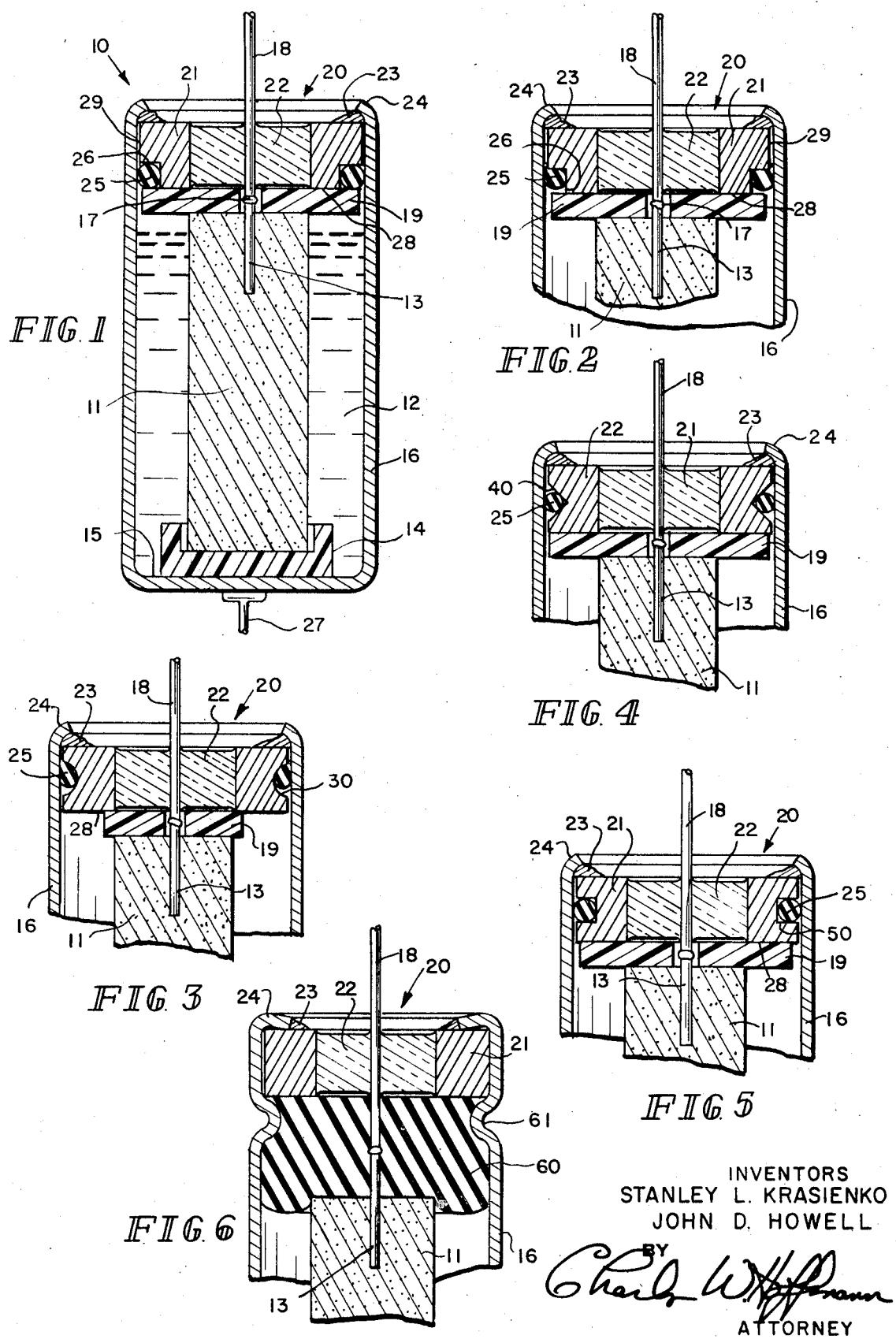

3,515,951
HERMETICALLY SEALED ELECTROLYTIC
CAPACITOR
Stanley L. Krasienko, Indianapolis, Ind., and John D. Howell, Lake Park, Fla., assignors to P. R. Mallory & Co. Inc., Indianapolis, Ind., a corporation of Delaware
Filed Apr. 15, 1968, Ser. No. 721,234
Int. Cl. H01g 9/05, 9/10
U.S. Cl. 317—230                                     15 Claims

ABSTRACT OF THE DISCLOSURE

Means and methods for substantially preventing materials contained within a capacitor can having an open end closed by a glass-to-metal seal for forming a reaction product with the surface or surfaces of the glass-to-metal seal and the surface or surfaces of the can which are to be connected together by soldering, welding or the like. The means may be a resilient means cooperatively associated with the glass-to-metal seal and the side wall of the can.

---

The present invention relates to means for use in a hermetically sealed wet electrolytic capacitor which substantially prevents a material or materials contained within the housing of the capacitor from forming a reaction product with surfaces intended to be joined or bonded together. If a reaction product is allowed to be formed on the surfaces to be joined or bonded together, the reaction product may hinder the joining or bonding of the surfaces thereby necessitating an additional step or steps to render the metals joinable or result in the formation of a joint which may not be a hermetic joint. The present invention also relates to a method of making the electrolytic capacitor.

Several presently available electrolytic capacitors are fabricated using a conductive metal can, having at least one open end, which serves as a housing and the cathode electrode for the capacitor. The housing contains a porous anode which may be fabricated from any suitable film-forming metal. The anode may be anodized or aged so as to form a dielectric oxide film thereon using generally accepted anodizing or aging techniques. The anode of film-forming metal is substantially immersed in a suitable acid electrolyte solution. The open end of the can is closed by a suitable sealing means such as a gasket which is compressively retained by the open end of the can or a glass-to-metal seal seated in the open end of the can and connected thereto so as to provide a hermetic seal. The gasket has good elasticity and is substantially unaffected by the corrosive characteristic of the electrolyte solution and is extrudable to some degree so that when the open end of the capacitor is crimped, the gasket is compressed so as to conform to the contours of the can and of the crimp. It should be recognized that it is important to prevent the escape of the highly corrosive acid electrolyte solution for if the electrolyte solution does escape, it may attack and damage materials surrounding the capacitor. The gasket and the glass of the glass-to-metal seal both have projecting therefrom a terminal lead which is connected to the anode. The seal around the terminal lead is tight thereby providing a sealed structure. The gasket end seal does not provide a hermetic seal but is sufficient to prevent escape of the acid electrolyte solution from the housing.

Although satisfactory for its intended purpose, the gasket seal is generally unsuitable for use in capacitors where the capacitor is subjected to adverse environmental conditions such as elevated temperatures, for the gasket seal is, to a degree, porous and the electrolyte solution will, to some extent, vaporize and diffuse through the porous material of the gasket.

Reduction in the amount of electrolyte solution present within the capacitor effects the electrical characteristics of the device. Therefore, hermetic seals may be used to close the open end of the can when it is thought that the capacitor device is to be used in an environment which may adversely effect the electrical characteristics of the capacitor. When the adverse environmental condition is an elevated temperature, the hermetic seal does not prevent vaporization of the electrolyte solution, but the hermetic seal does substantially prevent the vapors of the electrolyte solution from escaping from the confines of the housing. Therefore, when the electrolyte vapor cools and condenses, substantially the same amount of electrolyte solution is present as was present before the electrolyte solution was subjected to the elevated temperature.

It has been proposed that a glass-to-metal seal using a stainless steel ring be used to close and seal the open end of the wet, electrolyte capacitor. The glass-to-stainless steel seal may include a stainless steel ring which may have several layers of metals and metal alloys so as to render the stainless steel solderable. It was found that stainless steel of the type used in the hermetic seal developed a thermal oxide film at elevated temperatures required to fabricate the glass-to-metal seal which, thermal oxide film, tended to reduce the solderability of the stainless steel. Metals and/or metal alloys are plated over the stainless steel which are not corrosively attacked by the acid electrolyte solution, which do not develop a thermal oxide film at the elevated temperatures used to form the glass-to-metal seal and which are solderable.

It was found that, on occasion, the glass-to-plated stainless steel seal tended to form a reaction product with materials within the capacitor can such as, possibly, the vapors formed by the vaporization of a small part of the acid electrolyte solution during the soldering or welding of the glass-to-plated stainless steel to the can so as to close the open end of the can. The reaction product tended to hinder the welding or soldering operation so that, on occasion, an imperfect weld or solder joint was formed thereby undermining the ability of the joint to maintain the hermetic seal.

Therefore, it is an object of the present invention to overcome the problems enumerated above.

Another object of the present invention is to provide a means and method whereby the materials contained within a can housing a wet electrolytic capacitor are prevented from forming a reaction product with a glass-to-metal seal and/or a can which hinders the connection of the glass-to-metal seal used to close the open end of a can containing the capacitor to the can.

Yet another object of the present invention is to provide a hermetically sealed capacitor including means for substantially preventing vapors from the acid electrolyte solution from forming a reaction product with a glass-to-metal seal and/or with the side wall of the housing of the capacitor during the step of joining or bonding the glass-to-metal seal to the side wall of the capacitor can to thereby hermetically seal the capacitor.

Yet still another object of the present invention is to provide a hermetically sealed capacitor including a glass-to-metal seal and an elastomer means which efficiently and effectively deforms into the void area or areas between the glass-to-metal seal and the wall of a can during the operation of joining or bonding the glass-to-metal seal to close the open end of the housing of the capacitor.

A further object of the present invention is to provide an elastomeric means which is cooperatively associated with a glass-to-metal seal.

Another object of the present invention is to provide a hermetically sealed capacitor including means providing effective protection against acid electrolyte vapor leakage from the internal area of the capacitor containing the acid electrolyte solution during the connection of the glass-to-metal seal to the inner wall of the housing at a comparatively nominal expense.

Yet another object of the present invention is to provide a hermetically sealed liquid electrolyte capacitor.

Yet still another object of the present invention is to provide an improved hermetically sealed electronic device wherein the housing components thereof are bonded together so as to resist cracking therebetween even when subjected to widely fluctuating temperatures.

A further object of the present invention is to provide a process for joining at least two metal parts of which one of the parts is predominately stainless steel so as to provide a strong mechanical joint and to provide a hermetic seal between the metallic parts.

Yet another object of the present invention is to provide a hermetically sealed capacitor means including resilient means loosely seated in a peripheral recess or step of a glass-to-metal seal which deforms into a void area or areas when the internal pressure of the capacitor is increased so as to tightly inter-fit with the recess or step and the inner wall of the can used to seat the anode of the capacitor during connection of the glass-to-metal seal to the inner wall of the can.

Yet another object of the present invention is to provide a hermetically sealed capacitor including resilient means loosely seated in a peripheral recess of a glass-to-metal seal wherein said resilient means is fabricated from an elastomer material which is substantially uneffected by the corrosive characteristic of the acid electrolyte solution of the capacitor.

With the aforementioned objects enumerated, other objects will be apparent to those persons possessing ordinary skill in the art. Other objects will appear in the following description, appended claims and apended drawings. The invention relates to the novel construction, combination, arrangement and cooperation of elements as hereinafter described and more particularly as defined in the appended claims.

The appended drawings illustrate embodiments of the present invention constructed to function in an advantageous mode for the practical application of the basic principles involved in the hereinafter described invention.

In the drawings:

FIG. 1 is a cross-sectional view of an electrolytic capacitor incorporating the subject matter of the present invention;

FIG. 2 is a partial cross-sectional view illustrating a normally loosely fitting resilient means deformed so as to fill the void area between the glass-to-metal seal and the side wall of the can thereby tightly fitting with the recess or step formed in the glass-to-metal hermetic seal and the side wall of the can;

FIG. 3 is a partial cross-sectional view showing the resilient means loosely seated in a substantially semicircular recess or step formed in the glass-to-metal seal;

FIG. 4 is a partial cross-sectional view of the present invention illustrating the resilient means loosely seated in a substantially triangular shaped recess or step formed in the glass-to-metal hermetic seal;

FIG. 5 is a partial cross-sectional view illustrating the resilient means loosely seated in a substantially square-shaped recess or step formed in the glass-to-metal hermetic seal; and FIG. 6 is a partial cross-sectional view of a capacitor having a crimp disposed around the can for positioning a large mass of resilient means to substantially prevent vapor of the acid electrolyte solution from forming a reaction product with the areas of the can and the glass-to-metal seal to be joined together by soldering.

Generally speaking, the present invention relates to a resilient means normally loosely seated in a peripheral recess or step portion of a glass-to-metal seal for an electrolytic capacitor. The resilient means is adjacent the inner side wall of a can containing an anode of film-forming metal having a myriad of intercommunicating voids. The glass-to-metal seal is used to close the open end of the can. The resilient means deforms in response to an increase in internal pressure within the capacitor so as to tightly engage with the recess of the glass-to-metal seal and the inner wall of the can during the step of joining the glass-to-metal seal to the side wall of the can. The deformed resilient means fills the void area or areas between the glass-to-metal seal and the can thereby substantially preventing material or materials confined within the can from coming in contact with and thereafter forming a reaction product with the portion of glass-to-metal seal which is to be soldered, welded or the like to the side wall of the can. If the reaction product is allowed to form in the aforementioned areas, soldering, welding and the like of the glass-to-metal seal to the side wall of the can may be hindered.

An electrolytic capacitor 10 is illustrated in FIG. 1 of the drawing. The capacitor includes an anode 11 of a porous film-forming metal such as tantalum, niobium, titanium, hafnium, zirconium and the like. The porous anode may be prepared by compacting and sintering the film-forming metal powder by conventional powder metallurgy techniques. The anode includes a multiplicity of intercommunicating voids which greatly multiply the surface area with respect to the relatively small volume of the anode. An axial anode riser 13 extends from the anode and is fabricated of the same film-forming metal as the anode is itself. For example, if the anode is composed essentially of tantalum, the anode riser is composed essentially of tantalum. The anode riser may be included with the powder to be used to fabricate the anode when the anode powder is pressed and sintered or the anode riser may be formed separately from the anode and then attached to the anode.

The anode 11 is substantially immersed in an acid electrolyte solution 12. The electrolyte solution may be of any several different acid electrolyte solutions such as sulfuric acid, hydrochloric acid and the like which conducts ions between the electrodes of the capacitor and wihch conducts ions between the electrodes of the capacitor and which is capable of forming a metal oxide film on the surface of the anode when the anode is subjected to a positive potential with respect to the electrolyte solution. Of the several acceptable electrolyte solutions, a sulfuric acid electrolyte solution having a concentration of about 39% by weight sulfuric acid is preferred.

The anode 11 may be supported by an insulating cup-like means 14 which may be fabricated from a suitable material such as fluorocarbon copolymer material which includes polytrifluorochloroethylene and polytetrafluoroethylene and the like. The inner diameter of the cup-like means, in which the anode is supported, may slightly exceed the outer diameter of the anode so to permit the acid electrolyte solution 12 to remain in contact with the portion of the longitudinal surface of the anode contained within the cup-like means. The cup-like means 14, in turn, is supported by the closed end 15 of the can 16. The can constitues the cathode of the completed capacitor. The can or container 16 may be fabricated from a highly conductive metal such as any metals in the group consisting of copper, silver, gold, aluminum, tinned copper and the like. Of the several metals which may be used to fabricate the can, silver is preferred.

A conductive metal terminal lead 18 of the same film-forming metal as the anode riser and the anode may be butt or lap welded to the anode riser as shown at 17. The terminal lead may extend axially from the open end of the container. The axial terminal lead serves as the positive terminal lead for the completed capacitor. An apertured spacer 19 is so positioned so as to circumscribe the tantalum riser and the axial terminal lead in the vicinity of the butt weld. The spacer may be fabricated from a suitable material such as a fluorocarbon copolymer material which includes polytetrafluororethylene, polytrifluorochloroethylene and the like.

Another conductive metal terminal 27 may be butt welded, soldered and the like to the exterior surface of the closed end of the container. The terminal lead may extend axially from the closed end of the can. It should be noted, however, that the terminal lead need not be connected to the housing of the capacitor since the can itself may function as the cathode terminal of the capacitor thereby eliminating the use of a cathode terminal lead.

A glass-to-metal hermetic seal 20 is shown as substantially closing the open end of the can 16. The glass-to-metal seal includes a metal ring 21 substantially circumscribing a glass annulus 22 and is soldered, welded or the like at 23 to the bent over edge portion 24 of the can 16.

A suitable glass for use as the glass portion of the glass-to-metal seal may contain the following constituents by weight about 28–38% silicon, about 20–23% sodium, about 4–5% potassium, about 10–12% barium and the remainder oxygen with traces of lead, chromium, lithium, copper and tin.

The metal ring portion of the glass-to-metal seal may consist essentially of a metal or metals which are not adversely effected by the corrosive action of the acid electrolyte solution. Of several possible metals, stainless steel is preferred. If stainless steel is used, a suitable stainless steel consists esesentially of about 2% by weight manganese, about 1% by weight silicon, 19–21% by weight chromium, about 30–38% by weight nickel, about 2–3% by weight molybdenum, about 3–4% by weight copper with minor additions of columbium, tantalum, phosphorus and sulfur and the remainder iron. It was found that the stainless steel formed a tenacious thermal oxide film during the fabrication of the seal which, on occasion, inhibited the soldering operation of the seal to the side wall of the can. In order to substantially prevent the formation of the thermal oxide film, the stainless steel ring may be covered with a thin barrier layer of metal selected from the group consisting of nickel, cobalt and chromium which in turn is covered with a layer of a silver-noble alloy. The noble metal may be selected from the group consisting of gold, palladium, platinum, rhenium and osmium. If a nickel barrier layer metal is used, the nickel metal layer is about 0.0002 to 0.0004 inch thick. If an alloy of silver and gold overlays the nickel barrier, the alloys consists essentially of about 80–98% by weight silver, the remainder gold with minor amounts of impurities. The preferred alloy composition is about 88% by weight silver the remainder essentially gold with minor amounts of impurities. The resulting glass-to-metal seal does not form the tenacious thermal oxide film that the unlayered stainless steel does. The resultant seal is solderable to the can and is substantially uneffected by the corrosion characteristic of the acid electrolyte solution. However, the metals of the seal may form a reaction product with vapors of the acid electrolyte which may be produced during the step of connecting the glass-to-metal seal of the can. It is thought if a sulfuric acid solution is used as the electrolyte for the capacitor, a portion of the electrolyte may vaporize to form an oixde such as $SO_2$, and/or a sulfate such as $SO_4$ which may react with the layered metal on the stainless steel or the side wall of the can to form a reaction product which may inhibit the wetting action of the solder thereby producing an imperfect junction.

A loose fitting resilient means 25 is used in conjunction with the glass-to-metal seal so as to deform and thereby temporarily fill the void area and/or areas between the glass-to-metal seal and the periphery of the container will adjacent the glass-to-metal seal when the internal pressure of the capacitor increases. The internal pressure of the capacitor increases during the soldering or welding step due in large measure to the vaporization of a portion of the acid electrolyte solution. The deformed resilient means substantially prevents the vapors of the acid electrolyte from coming in contact with the areas of the glass-to-metal seal and the side wall of the can to be joined or bonded together. The prevention of the escape of the vaporized electrolyte substantially eliminates the formation of reaction products on the surface of the glass-to-metal seal and on the surface of the can to be connected to the glass-to-metal seal. The areas to be joined or bonded together remained solderable using conventional soldering techniques. It should be noted that the resilient means moves outwardly and upwardly to fill the void area or areas between the glass-to-metal seal and the wall of the can. A gasket is usually used as a compressive seal which moves or is compressed inwardly to fill void areas. Loosely seated resilient means 25 may be an O-ring like means fabricated from any suitable elastomer or resilient material such as silicone rubber, polytetrafluoroethylene, polytrifluorochloroethylene or an elastomer having a durometer of 40 or softer or the like which is not adversely effected by the corrosive characteristic of the acid electrolyte solution. The resilient means 25 may be fabricated as an integral part of the spacer 19 shown in FIG. 1 of the drawing.

A notch, recess or step 26 is formed in the periphery of the ring-like metal member 21 of the glass-to-metal seal 20. The step 26 may take any of several shapes, such as a semi-circular-like shape recess 30 illustrated in FIG. 3, a triangular-like shape recess 40 illustrated in FIG. 4, a square-like shape recess 50 illustrated in FIG. 5, or the like. The recess or step may be positioned substantially at any position along the periphery 29 of the member 21. The most preferred location of the step is at the interior end surface 28 of the glass-to-metal seal so as to form a step-like recess. A rectangular-shaped step recess is shown in FIG. 1 and extends substantially 360° around the interior end surface 28 of the glass-to-metal seal 20.

FIG. 6 shows another embodiment of the present invention. A resilient washer 60 of silicone rubber, polytriflurorchloroethylene or the like is compressively retained from longitudinal movement by the glass-to-metal seal 20 and the spacer 13. A circumferential crimp 61 is formed around the outer periphery of the can to thereby exert at all times a constant force on the resilient washer to thereby compressively retain the washer in the can at all times. The compressed washer substantially prevents any vaporized acid electrolyte from coming in contact with the areas of the glass-to-metal seal and the side wall of the can during the soldering or welding of the hermetic seal to the side wall of the can. It should be noted that the resilient washer does not deform so as to occupy the void areas between the glass-to-metal seal and the side wall of the can as the internal pressure within the can increases but rather occupies substantially all the area between the glass-to-metal seal and the anode. The substantially tight seal during the soldering step is achieved by compressively retaining the resilient washer in the can as indicated in FIG. 6.

Having thus explained the structure of the present invention, the function of the loose fitting resilient means will be described.

The glass-to-metal seal is welded or soldered as indicated at 23. During the welding or soldering step or operation, sufficient heat may be developed so as to cause a small portion of the acid electrolyte solution to vaporize. The portion of the acid electrolyte solution which is vaporized causes the internal pressure within the capacitor device to increase. The increase in the internal pressure within the can causes the loose fitting resilient O-ring 25 to deform in the manner indicated in FIG. 2 thereby substantially occupying the void area between the glass-to-metal seal and the side wall of the can or container. By occupying the void area between the glass-to-metal seal and the can, the vaporized electrolyte material present, if any, is substantially prevented from finding its way to the area of the glass-to-metal seal that is to be soldered or welded to the can. By so doing, the vapors of the electrolyte are prevented from forming a reaction product such as an oxide, a sulfate, a chloride or the like with the area of the glass-to-metal seal and the can that are to be soldered, welded or the like. The soldering, welding or the like step or operation may be carried out easily and conveniently without the necessity of using an ancillary flux means to clean a reaction product from the metal portion of the glass-to-metal seal and the metal portion of the can which are to be soldered, welded or otherwise bonded together. Upon cooling of the vaporized material, the internal pressure of the capacitance device is returned to substantially normal and the expanded resilient means returns to its normal position such that a tight fit does not exist between the resilient means and the inner wall of the can.

While the invention is illustrated and described in several embodiments, it will be understood that modifications and variations may be affected without departing from the scope of the novel concepts of this invention and as set forth in the appended claims.

Having thus described our invention, we claim:

1. In an electrolytic capacitor including an anode with an anode riser projecting from said anode, a can having an open end and a closed end for retaining said anode and said anode riser extending through said open end, a liquid electrolyte solution in the can substantially immersing said anode, and a glass-to-metal seal fixedly connected to the side wall of said can hermetically closing the open end of said can, the improvement comprising said glass-to-metal seal having a peripheral recess formed substantially therearound, a resilient means seated in said peripheral recess adjacent the inner side wall of said can, said resilient means fitting within said recess and against said inner wall of the can, at least during the connecting of said glass-to-metal seal to said inner side wall of said can, for substantially preventing materials in said can from forming a reaction product which hinders connection of said glass-to-metal seal to said inner wall of said can.

2. In the electrolytic capacitor of claim 1, wherein said peripheral recess is a peripheral step formed in said glass-to-metal seal.

3. In the electrolytic capacitor of claim 2, wherein said resilient means has a substantially O-shaped cross-section.

4. In the electrolytic capacitor of claim 1, wherein said resilient means is integral with a spacer positioned between said seal and said anode.

5. In the electrolytic capacitor of claim 1, wherein said resilient means is an elastomer means.

6. In the electrolytic capacitor of claim 5, wherein said elastomer means is selected from the group consisting of silicone rubber, polytrifluorochloroethylene and polytetrafluoroethylene.

7. In the electrolytic capacitor of claim 1, wherein said peripheral recess is substantially triangular-shaped.

8. In the electrolytic capacitor of claim 1, wherein said peripheral recess is substantially square-shaped.

9. The electrolytic capacitor of claim 1, wherein said peripheral recess is substantially rectangular-shaped.

10. The electrolytic capacitor of claim 1, wherein said peripheral recess is substantially semicircular-shaped.

11. In a method for making an electrolytic capacitor comprising an open ended can, an electrolyte in the can, an anode of film forming metal substantially immersed in said electrolyte with an anode riser extending through the open end of the can, and a metal-to-glass seal hermetically closing the open end of the can, the improvement comprising:

forming a recess in the periphery of the metal portion of said glass-to-metal seal;

seating a circumferential resilient means in said peripheral recess;

positioning said glass-to-metal seal in the open end of said can, with the resilient means, at least in part, engaging the wall of the can; and connecting said glass-to-metal seal to the wall of said can in an hermetic seal and at least while the internal pressure of said capacitor increases during connecting of said glass-to-metal seal to the wall of said can, said resilient means at least partially deforming to seal the interior of said capacitor from that portion of said glass-to-metal seal being so connected.

12. The method of claim 11, wherein said increase of said internal pressure of said can is substantially due to the vaporization of an amount of said acid electrolyte solution.

13. The method of claim 11, wherein said resilient means has a substantially O-shaped cross-section.

14. The method of claim 11, wherein said glass-to-metal seal is soldered to said side wall of said can.

15. The method of claim 11, wherein said resilient means is normally loosely seated in said recess formed in said glass-to-metal seal.

References Cited

UNITED STATES PATENTS

| | | | |
|---|---|---|---|
| 3,131,337 | 4/1964 | Clement | 317—230 |
| 3,243,668 | 3/1966 | Diggens | 317—230 |
| 3,248,618 | 4/1966 | Szpak et al. | 317—230 |
| 3,301,270 | 1/1967 | Horn | 317—230 |
| 3,321,675 | 5/1967 | Diggens | 317—230 |

JAMES D. KALLAM, Primary Examiner

U.S. Cl. X.R.

317—233; 174—50.61